United States Patent
Palmer et al.

(10) Patent No.: US 8,780,553 B2
(45) Date of Patent: Jul. 15, 2014

(54) CRADLE FOR MOBILE UNIT

(71) Applicant: Motorola Solutions, Inc., Schaumburg, IL (US)

(72) Inventors: Mark C. Palmer, Bay Shore, NY (US); Michael Astanovsky, Hadera (IS); Ariel Rotman, Ramat Efal (IS)

(73) Assignee: Motorola Solutions, Inc., Schaumburg, IL (US)

( * ) Notice: Subject to any disclaimer, the term of this patent is extended or adjusted under 35 U.S.C. 154(b) by 58 days.

(21) Appl. No.: 13/677,353

(22) Filed: Nov. 15, 2012

(65) Prior Publication Data
US 2014/0134874 A1  May 15, 2014

(51) Int. Cl.
| | |
|---|---|
| H05K 5/00 | (2006.01) |
| H05K 7/00 | (2006.01) |
| G06F 1/16 | (2006.01) |
| H04M 1/00 | (2006.01) |
| F16M 11/00 | (2006.01) |
| A47B 96/00 | (2006.01) |
| A47K 1/00 | (2006.01) |
| A47K 5/00 | (2006.01) |
| E04G 5/06 | (2006.01) |
| F16L 3/08 | (2006.01) |
| F21V 21/00 | (2006.01) |
| F21V 35/00 | (2006.01) |
| A47K 1/08 | (2006.01) |
| A44B 6/00 | (2006.01) |
| A45F 5/00 | (2006.01) |

(52) U.S. Cl.
USPC ............ 361/679.57; 361/679.41; 361/679.43; 361/679.58; 455/575.8; 455/575.9; 248/220.21; 248/220.22; 248/313; 248/176.1; 24/3.1; 24/3.7

(58) Field of Classification Search
USPC ............ 361/679.41, 679.42, 679.43, 679.57, 361/679.58; 455/575.8, 575.9; 248/176.1, 248/220.21, 220.22, 313; 24/3.1, 3.7
See application file for complete search history.

(56) References Cited

U.S. PATENT DOCUMENTS

| | | | | |
|---|---|---|---|---|
| 6,229,893 | B1 * | 5/2001 | Chen | 379/454 |
| 6,427,959 | B1 * | 8/2002 | Kalis et al. | 248/288.11 |
| 6,647,248 | B1 * | 11/2003 | Ortscheid et al. | 455/575.1 |
| 6,711,921 | B1 * | 3/2004 | Yang | 70/58 |
| 6,874,744 | B2 * | 4/2005 | Rawlings et al. | 248/292.14 |
| 7,016,181 | B2 * | 3/2006 | Ito et al. | 361/679.31 |
| 7,017,243 | B2 * | 3/2006 | Carnevali | 24/523 |
| 8,074,951 | B2 * | 12/2011 | Carnevali | 248/313 |
| 8,177,178 | B2 | 5/2012 | Carnevali | |
| 8,223,488 | B2 | 7/2012 | Peter | |
| 2004/0174671 | A1 * | 9/2004 | Huang et al. | 361/683 |
| 2005/0090301 | A1 * | 4/2005 | Lange et al. | 455/575.8 |
| 2009/0207558 | A1 | 8/2009 | Hsiung et al. | |

* cited by examiner

Primary Examiner — Anthony Haughton

(57) ABSTRACT

A cradle locks a mobile unit (MU) therein with a single insertion process. The cradle includes a cup shaped to receive a first portion of the MU. The cradle includes a backing portion including a first end coupled to the cup portion. The cradle includes a hoop portion movably coupled to a second end of the backing portion for movement between a securing position and a receiving position, the hoop being biased toward the securing position. The cradle includes a latch releasably securing the hoop portion in the receiving position. The cradle includes a plunger extending out of the backing portion in a first direction so that, when engaged by the MU, the plunger is moved in a second direction opposite the first direction moving the latch to release the hoop portion so that the hoop portion moves under its bias into the securing position.

20 Claims, 4 Drawing Sheets

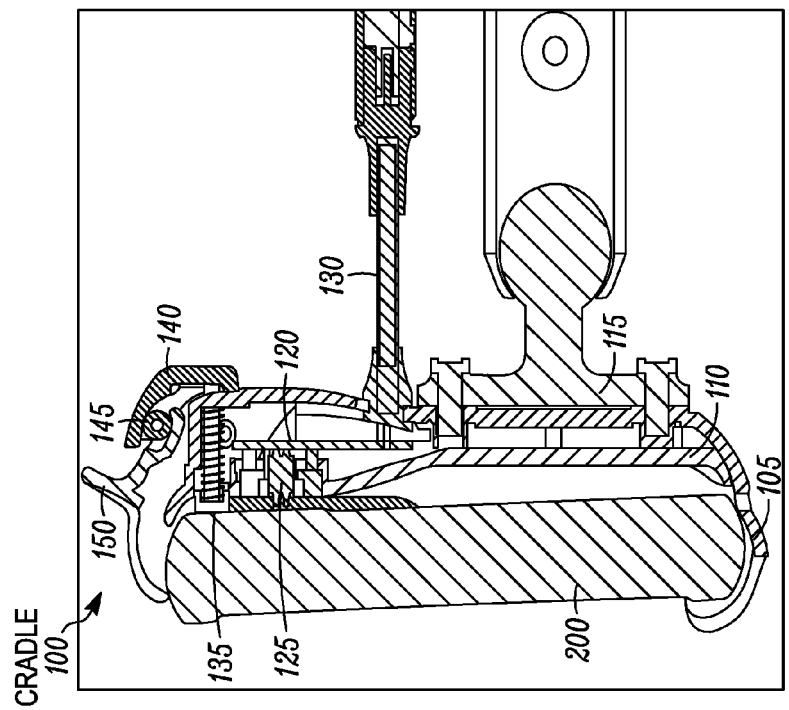
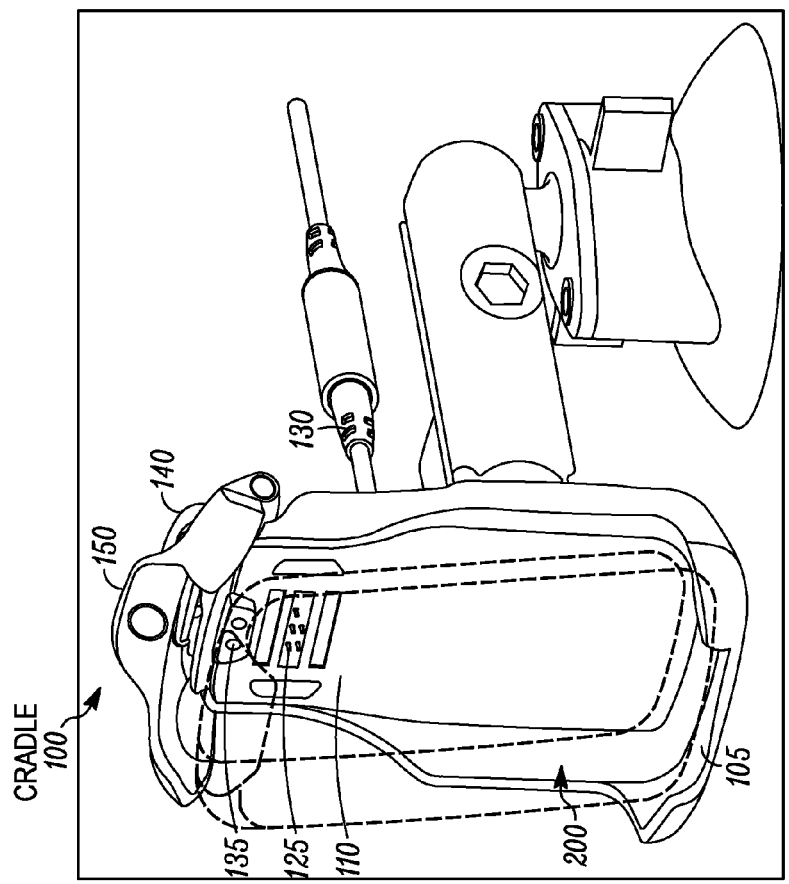

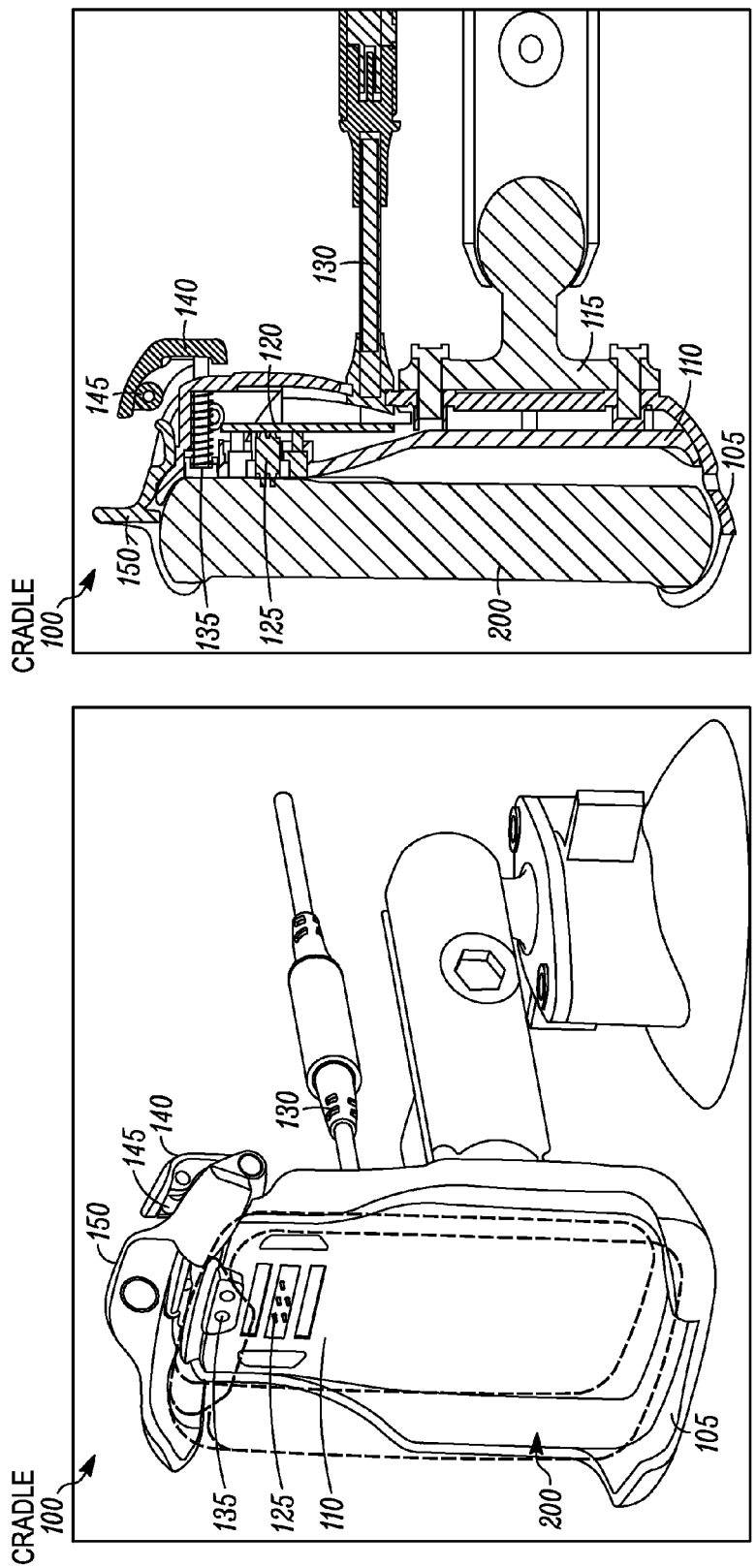

CRADLE FOR MOBILE UNIT

FIELD OF THE DISCLOSURE

The invention relates to a cradle to hold and secure a mobile unit therein with a locking mechanism that prevents damage to a housing of the mobile unit.

BACKGROUND

A cradle may be used to hold and secure a mobile unit (MU) therein. For example, a cradle may receive a MU such as a cellular phone. The cradle may include an attachment feature such as belt clip. For example, a conventional cradle may utilize a rigid frame with sufficient flexibility on a latch for the MU to be pushed into the cradle. The latch may be pushed to create enough space for the MU to be received in the cradle and snap into a locking position using a spring force where the latch may engage a recess on a housing of the MU. When the cradle is used to electronically connect the MU to further electronic devices (e.g., charger, antenna, speaker system, etc.), the cradle may be equipped with a connection feature that couples with a connection feature of the MU.

The operation for the conventional cradle to receive the MU may be performed using a single insertion or a two state insertion process. When the single insertion process is used, the conventional cradle may utilize a system as described above. That is, the user must provide sufficient force to physically move a sufficiently rigid component on the frame of the cradle. However, the single insertion process may cause damage, wear, cosmetic marks, etc. on the MU, particularly on the housing of the MU when the MU is received and removed from the cradle. Over time, the cradle and/or the MU may have enough damage that operations of either component may be affected. To alleviate the damage to the MU, the two state insertion process may be used. For example, the cradle may include a locking component that is lifted to create enough space for the MU to be received. The MU may subsequently be placed within the cradle. When the MU is properly received, the locking component may be returned to a locking configuration in which the MU is secured in the cradle. However, the two state insertion process always requires additional actions to be performed by the user for the MU to be properly secured in the cradle.

Accordingly, there is a need for a cradle that includes the advantages of both the single insertion process and the two state insertion process so that the cradle uses a single insertion process that does not damage or wear the MU.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

FIG. 2a illustrates a perspective view of the mobile unit being received in the cradle of FIGS. 1a-b in accordance with some embodiments.

FIG. 2b illustrates a side cross sectional view of the mobile unit being received in the cradle of FIGS. 1a-b in accordance with some embodiments.

FIG. 3a illustrates a perspective view of the mobile unit secured in the cradle of FIGS. 1a-b in accordance with some embodiments.

FIG. 3b illustrates a side cross sectional view of the mobile unit secured in the cradle of FIGS. 1a-b in accordance with some embodiments.

Figure 1A:
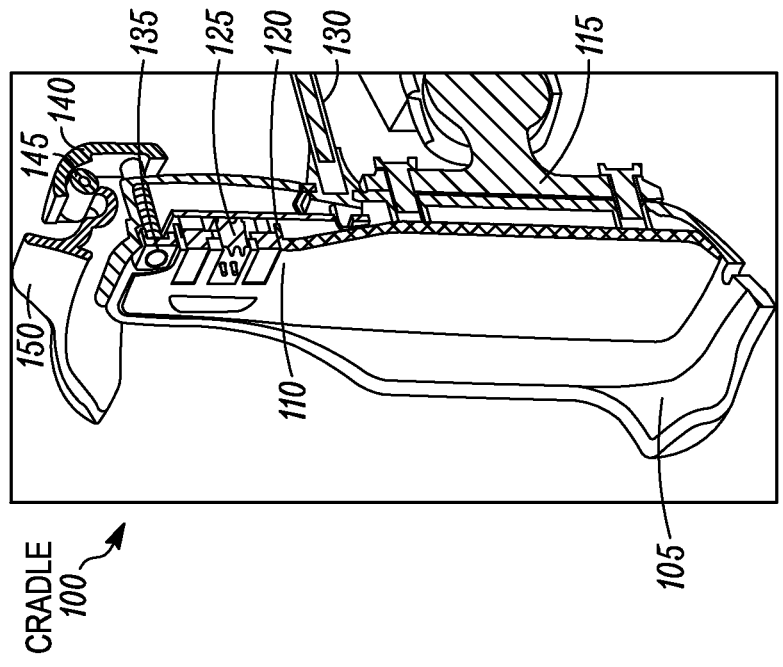
FIG. 1a illustrates a perspective view of a cradle using a single insertion process to secure a mobile unit therein in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

The present invention describes a cradle with a single insertion process of a mobile unit (MU). The cradle comprises a cup portion shaped to receive a first portion of the MU inserted therein; a backing portion including a first end coupled to the cup portion; a hoop portion movably coupled to a second end of the backing portion for movement between a securing position in which an end of the hoop portion extends over a second portion of the MU to secure the MU within the cradle and a receiving position in which the hoop portion is moved relative to the backing portion out of engagement with the second portion of the MU, the hoop being biased toward the securing position; a latch releasably securing the hoop portion in the receiving position; and a plunger extending out of the backing portion in a first direction so that, when engaged by the MU, the plunger is moved in a second direction opposite the first direction moving the latch to release the hoop portion so that the hoop portion moves under its bias into the securing position.

The exemplary embodiments may be further understood with reference to the following description and the appended drawings, wherein like elements are referred to with the same reference numerals. The exemplary embodiments describe a cradle for securing a MU therein with a locking mechanism that prevents damage to a housing of the MU. Specifically, a single insertion process may be used to secure the MU with the cradle and release the MU from the cradle. The cradle, the MU, the locking mechanism, and the single insertion process will be discussed in further detail below.

Figure 1B:
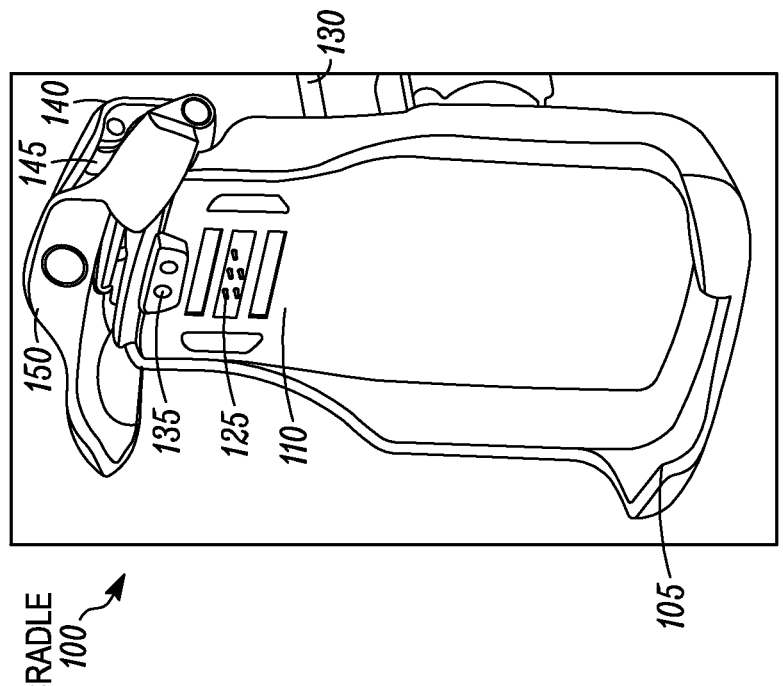
FIG. 1b illustrates a cross sectional view of the cradle of FIG. 1a in accordance with some embodiments.

FIG. 1a illustrates a perspective view of a cradle 100 using a single insertion process to secure a MU therein in accordance with some embodiments. FIG. 1b illustrates a cross sectional view of the cradle 100 of FIG. 1a in accordance with some embodiments. The cradle 100 may be configured to receive the MU and further provide an electrical connection to other electronic devices. For example, the cradle 100 may be used in a vehicle in which the MU electronically connects to a a charger, an antenna, a radio, etc. The MU may be any portable device such as a mobile phone, a personal digital assistant, a smartphone, a tablet, a laptop, a barcode reader, etc. Accordingly, the MU may be a handheld device in which the user is capable of performing a functionality thereon. The cradle 100 may be configured with a locking mechanism to securely hold the MU therein while also providing features to hold the cradle 100 in a fixed location and electronically connect the MU to other devices. As illustrated, the cradle 100 may include a cup portion 105, a backing portion 110, a mounting 115, a printed circuit board (PCB) 120, an electrical connector 125, a cable 130, and a locking mechanism including a plunger 135, a latch 140, a wheel 145, and a hoop portion 150.

The cradle 100 may be designed to accommodate a housing of the MU. The cradle 100 may include a frame for receiving the MU. Specifically, the frame may include the cup portion 105, the backing portion 110, and the hoop portion 150. The cup portion 105 may be part of the frame of the cradle 100. The cup portion 105 may be shaped and designed to receive a bottom portion of a housing of the MU. Thus, the cup portion 105 may engage the bottom portion of the housing of the MU by having a shape that corresponds to the bottom portion of the housing of the MU. In an exemplary embodiment of the present invention, the cup portion 105 may be shaped in a substantially similar manner as bumpers of a casing of the MU. Accordingly, as illustrated in FIG. 1a, the cup portion 105 may extend partially upwards along select sides thereof to cup the MU. The backing portion 110 may also be a part of the frame of the cradle 100. The backing portion 110 may be a solid piece extending from the cup portion 105 towards a top side of the cradle 100. Specifically, the cup portion 105 may be permanently coupled to the backing portion 110. The backing portion 110 may provide a surface on which a back surface of the housing of the MU may rest or engage the cradle 100. As will be described in further detail below, the backing portion 110 may also include a cradle housing in which components may be at least partially disposed such as wholly within, extending from within to beyond a surface of the cradle housing, etc. The hoop portion 150 may further be part of the frame of the cradle 100. The hoop portion 150 may be shaped and designed to receive a top portion of the housing of the MU. Thus, the hoop portion 150 may engage the top portion of the housing of the MU by having a shape that corresponds to the top portion of the housing of the MU. In a substantially similar manner as the cup portion 105, the hoop portion 150 may be shaped in a substantially similar manner as bumpers with select sides extending toward a bottom of the cradle 100. Further, as will be discussed in further detail below, the hoop portion 150 may be part of a locking mechanism that secures an engagement between the MU and the cradle 100.

It should be noted that the frrame of the cradle 100 including the cup portion 105, the backing portion 110, and the hoop portion 150 may include further features. For example, a portion of the frame may include recesses so that input devices or ports may be accessed on the MU. The MU may be equipped with a port (e.g., audio output port) that receives an electrical connector (e.g., ear phone jack). If disposed on the top or bottom portion of the housing of the MU, the hoop portion 150 or the cup portion 105, respectively, may include a recess so that the port is still accessible. In another example, the MU may include input devices (e.g., volume control buttons, power button, etc.) on a periphery of the housing of the MU. If the portion of the housing of the MU engages the frame of the cradle 100, the respective portion of the cup portion 105, the backing portion 110, and/or the hoop portion 150 may include features (e.g., a depressible molding over the input devices, a recess, etc.) to allow the input devices to still be used.

The mounting 115 may be coupled to the frame of the cradle 100. For example, the mounting may be coupled to the backing portion 110 and/or the cup portion 105. The mounting 115 may provide a component in which the cradle 100 may be coupled. As illustrated in FIG. 1a and more specifically with reference to FIG. 2a, the mounting 115 may include a ball and socket joint, one end including an attachment device such as a suction cup. Accordingly, the cradle 100 may be mounted on a smooth surface such as glass. For example, the cradle 100 may be mounted on a windshield of a vehicle. In another example, the mounting 115 may be a clip so that the cradle 100 may be hooked onto a thin surface such as a belt. It should be noted that the mounting 115 may be of any type to allow the cradle 100 to be affixed.

The cradle 100 may be configured to allow the MU to be received therein to electronically connect to further electronic devices. Accordingly, the cradle 100 may include the PCB 120, the electrical connector 125, and the cable 130. The PCB 120 may be a standard component providing electrical and/or mechanical pathways for different components. Therefore, the PCB 120 may provide an electrical connection between the electrical connector 125 and the cable 130. The electrical connector 125 may include at least one electrical contact that couples to a corresponding electrical contact of the MU. For example, the electrical connector 125 may be pogo pin contacts. The MU may have pogo pin receiving contacts. In other examples, the electrical connector 125 may be spring or flat contacts, a jack, rigid pins, etc. It should be noted that the electrical connector 125 may be the corresponding type of electrical connector. That is, the MU may include pogo pins contacts while the cradle 100 may include the flat contacts. It should also be noted that the disposition of the electrical connector 125 as shown in FIG. 1a is only exemplary. According to the exemplary embodiments of the present invention, the cradle 100 may be designed and shaped to correspond to the housing of the MU. Thus, if the MU has a corresponding electrical connector disposed on the housing at a particular location, the electrical connector 125 may be disposed accordingly. For example, if the corresponding electrical connector of the MU is disposed on a top side of the housing, the electrical connector 125 may be disposed on the hoop portion 150; if the corresponding electrical connector of the MU is disposed on a bottom side of the housing, the electrical connector 125 may be disposed on the cup portion 105; if the corresponding electrical connector of the MU is disposed on a back side of the housing, the electrical connector 125 may be disposed on the backing portion 110. The cable 130 may provide the electrical connection with one side receiving data via the electrical contact 125 and the PCB 120 and the other side being received in a further electronic device. For example, the other side of the cable 130 may be a USB plug, a jack, a vehicle adapter, etc.

The cradle 100 may also be configured to allow the MU to be secured in a manner that prevents wearing and damage to the housing of the MU. Accordingly, the cradle 100 may include a locking mechanism including the plunger 135, the latch 140, the wheel 145, and the hoop portion 150. As better illustrated in FIG. 3a, the plunger 135 may be a component that extends beyond the backing portion 110 in a first direction (e.g., toward an interior of the cradle 100). The plunger 135 may include a first side with an enlarged surface that engages a back side of the housing of the MU. The plunger 135 may include a second side that engages or is connected to the latch 140. The latch 140 may be a rigid component that extends from a first side that engages or is connected to the second side of the plunger towards a top side of the frame of the cradle 100. The latch 140 may include a second side that includes a bar or rod in which the wheel 145 is rotatably disposed. The wheel 145 may be configured to freely rotate on the bar of the latch 140. The wheel 145 may also be configured to engage the hoop portion 150. As discussed above, the hoop portion 150 may be configured to secure the MU within the cradle 110 on a top side of the housing of the MU. Thus, a first side of the hoop portion 150 may be shaped and designed to correspond to the top side of the housing of the MU. A second side of the hoop portion 150 may include a recess that receives the wheel 145 when the cradle 100 is in a receiving configuration. The wheel 145 may be rotatably or movably coupled to the rod so that the wheel 145 may roll in and out of the recess of the hoop portion 150. The hoop portion 150 may also include a spring connector that normally places the cradle 100 in a securing position in which the hoop portion 150 is substantially perpendicular to the backing portion 110 in a rest position (e.g., hoop portion using its own bias to return to the securing position). Thus, when the wheel 145 disengages the recess of the hoop portion 150, the hoop portion 150 may return to a disposition corresponding to the securing position. The latch 140 may cause the wheel 145 to disengage from the recess of the hoop portion 150 when the plunger 135 is moved backward a predetermined distance. That is, the plunger 135 may move an initial amount that is less than the predetermined distance that allows the wheel 145 to continue to engage the recess of the hoop portion 150, thereby maintaining the hoop portion 150 in the receiving configuration. When the plunger 135 is moved beyond the predetermined distance, the wheel 145 may disengage, thereby placing the hoop portion 150 in the securing position. According to a specific exemplary embodiment of the present invention, the plunger 135 may be coupled to a spring that generates a spring force when the plunger 135 is engaged and moved backward. That is, the spring force may place the plunger 135 in a rest position that is beyond the backing portion 110. The mechanism in which the MU becomes secured will be discussed in further detail below with regards to FIGS. 3a-3c.

FIG. 2a illustrates a perspective view of the MU 200 being received in the cradle 100 of FIGS. 1a-b in accordance with some embodiments. FIG. 2b illustrates a side cross sectional view of the MU 200 being received in the cradle 100 of FIGS. 1a-b in accordance with some embodiments. Specifically, the cradle 100 may be in a receiving configuration in which the hoop portion 150 is disposed in a receiving position. In the receiving configuration, the plunger 125 may extend beyond the backing portion 110 in the first direction. Accordingly, the latch 140 may be disposed in a manner that the wheel 145 engages the recess of the hoop portion 150. The hoop portion 150 may also be disposed in a manner that allows the MU 200 to be received within the cradle 100. Specifically, the hoop portion 150 is angled upward to generate a clearance for the MU 200 to be received.

FIG. 3a illustrates a perspective view of the MU 200 secured in the cradle 100 of FIGS. 1a-b in accordance with some embodiments. FIG. 3b illustrates a side cross sectional view of the MU 200 secured in the cradle 100 of FIGS. 1a-b in accordance with some embodiments. Specifically, the cradle 100 may be in the secured configuration in which the hoop portion 150 is disposed in the securing position. In the secured configuration, the plunger 125 may be engaged by the housing of the MU 200. In a specific exemplary embodiment, the plunger 125 may be engaged in a manner that the plunger 125 no longer extends beyond the backing portion 110 and is flush therewith (e.g., the plunger 125 moves in a second direction opposite the first direction). When the plunger 125 is engaged by the housing of the MU 200, the plunger 125 may push the latch 145 backwards in the second direction. Subsequently, the wheel 145 may disengage from the recess of the hoop portion 150 that causes the hoop portion 150 to return to its normal biased (securing) position in which the hoop portion 150 is no longer angled and extends in a substantially perpendicular manner with respect to the backing portion 110.

Figure 4A:
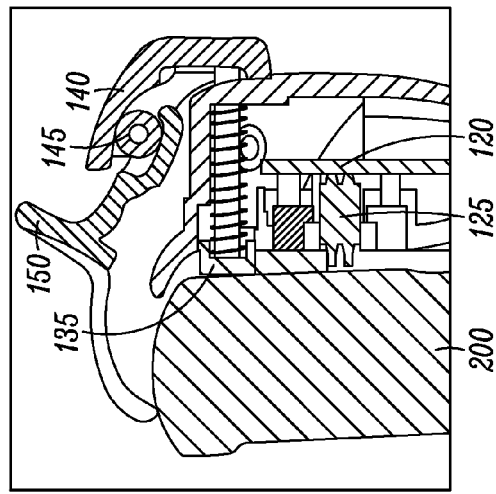
FIGS. 4a-c illustrate a process of securing the mobile unit in the cradle of FIGS. 1a-b in accordance with some embodiments.
Figure 4B:
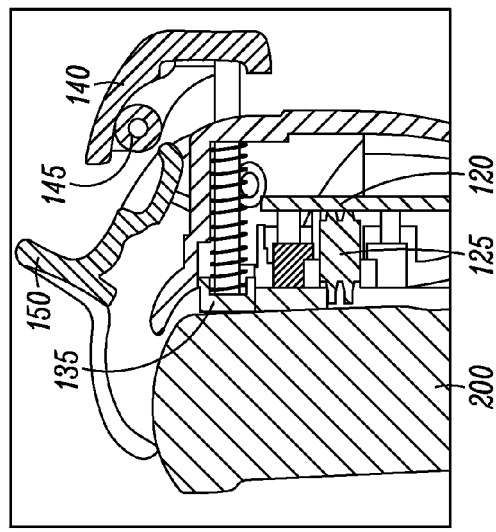
Figure 4C:
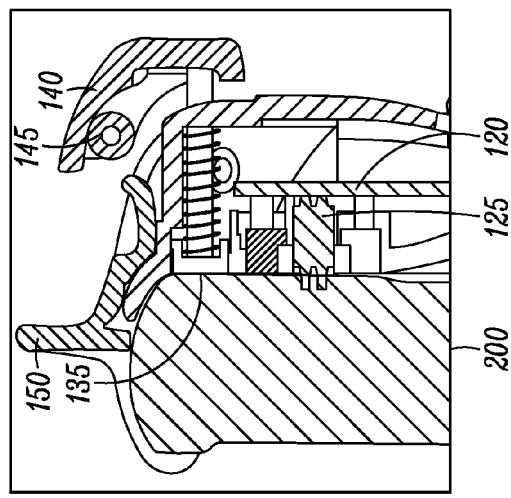

FIGS. 4a-c illustrate a process of securing the MU 200 in the cradle 100 of FIGS. 1a-b in accordance with some embodiments. Specifically, the process of securing the MU 200 in the cradle 100 relates to the locking mechanism of the cradle 100, creating the electrical connection between the MU 200 and a further electronic device, and changing a configuration of the cradle 100 from the receiving configuration to the secured configuration. In FIG. 4a, the cradle 100 may be in the receiving configuration. As discussed above, in the receiving configuration, the plunger 135 may be in the rest position in which the first side of the plunger 135 extends beyond the backing portion 110. The latch 140 may also be disposed so that the wheel 145 engages the hoop portion 150 that is in the receiving position in which the hoop portion 150 is angled upward to create the clearance for the MU 200. As illustrated in FIG. 2a, when the MU 200 is initially received, the cup portion 105 may receive the bottom portion of the housing of the MU 200. The MU 200 may be received at an angle so that the cup portion 105 is initially engaged by the housing of the MU 200. In FIG. 4b, the cradle 100 may be in an intermediary configuration. The MU 200 may be pushed backward in the second direction to engage the plunger 135. As the plunger 135 begins to move backward in the second direction, the latch 140 may also move backward in the second direction which causes the wheel 145 to begin to disengage with the recess of the hoop portion 150. Thus, as the plunger 135 is placed in a tensed position, the wheel 145 moves to disengage the hoop portion 150 as the plunger 135 is moved to an amount corresponding to the predetermined distance. It should be noted that the hoop portion 150 may remain in the receiving configuration during the intermediary configuration. In FIG. 4c, the cradle 100 may be in the secured configuration. When the MU 200 is fully moved backward so that the back of the housing of the MU 200 lies substantially flush with the backing portion 110, the plunger 135 may have moved beyond the predetermined distance. Accordingly, the wheel 145 may have disengaged from the recess of the hoop portion 150. The hoop portion 150 may be moved from the receiving position (e.g., angled upward) to the securing position in which the hoop portion 150 extends susbstantially perpendicular with respect to the backing portion 110. With the hoop portion 150 being shaped and designed as discussed above, the MU 200 may be secured in the cradle 100 between the cup portion 105 and the hoop portion 150. The spring connector of the hoop portion 150 may prevent the hoop portion 150 from returning to the receiving position, thereby further securing the MU 200 within the cradle 100. In the secured configuration, the electrical connector 125 may be coupled to corresponding electrical connectors of the MU 200. For example, when the electrical connector 125 are pogo pin contacts, they may be received within pogo pin receiving contacts of the MU 200. Using the above described securing process, a single insertion process may be used to secure the MU 200 within the cradle 100 without causing wear or damage to the housing of the MU 200.

It should be noted that the creation of the electrical connection is only exemplary. According to another exemplary embodiment of the present invention, the cradle 100 may simply be used for a securing device to a fixed location such as a clip locking on a belt. Thus, the components of the electrical connection may not be disposed on the cradle 100. However, the locking mechanism including the plunger 135, the latch 140, the wheel 145, and the hoop portion 150 may still secure the MU 200 in the cradle 100 with a single insertion process without creating any damage or wear on the MU 200.

When the MU 200 is to be released from the cradle 100, a force may be generated on the hoop portion 150. Specifically, a force greater than that generated by the spring connector of the hoop portion 150 may be applied on the hoop portion 150. Accordingly, the hoop portion 150 may include an upward extension that provides an enlarged surface on which a user may push the hoop portion 150. When the force is applied to the hoop portion 150, the hoop portion 150 may be placed in the receiving position corresponding to the receiving configuration of the cradle 100 in which the hoop portion 150 is disposed angularly upward. Thus, viewing FIGS. 4a-c in reverse order, when the hoop portion 150 is engaged to an amount that corresponds to the predetermined amount for the plunger 135, the wheel 145 may begin to engage the recess of the hoop portion 150. Since the plunger 135 is in a tensed position when the cradle 100 is in the secured configuration, the wheel 145 may roll into the recess due to the spring force of the plunger 135. The spring force of the plunger 145 causes the wheel to re-engage the recess of the hoop portion 150 that causes the latch 140 to move respectively. The plunger 135 may return to the rest position in the receiving configuration. The plunger 135 may also move a top portion of the MU 200 outward with a bottom portion still engaging the cup portion 105. The electrical connector 125 may also de-couple from the corresponding electrical connector of the MU 200. With the hoop portion 150 returning to the tensed position in the receiving configuration, the clearance is again created to allow the MU 200 to be removed from the cradle 100. In this manner, a single releasing process may be used to remove the MU 200 from within the cradle 100, also without causing wear or damage to the housing of the MU 200.

The exemplary embodiments of the present invention provide a cradle for securing a MU therein with a locking mechanism that prevents damage to a housing of the MU. The cradle also provides a single insertion process in which a locking mechanism is used to secure the MU in the cradle. The single insertion process includes the bottom portion of the housing of the MU being received in a cup portion of the cradle and pushing the MU backward while the cradle is in a receiving configuration including a sufficient clearance for the MU to be received. The MU being pushed backward pushes a plunger that extends beyond a housing of the cradle. The plunger allows a wheel connected to a latch connected to the plunger to disengage from a hoop portion. The hoop portion is moved from a receiving position to a securing position when the plunger is moved a predetermined distance in which the hoop portion is placed over the top portion of the housing of the MU, thereby securing the MU within the cradle in a secured configuration. To release the MU from the cradle, the hoop portion may be applied with a sufficient force for an opposite process as the insertion process that causes the plunger to push the top portion of the housing of the MU outward, thereby allowing the MU to be removed with the sufficient clearance of the receiving configuration.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A cradle with a single insertion process of a mobile unit (MU), comprising:
   a cup portion shaped to receive a first portion of the MU inserted therein;
   a backing portion including a first end coupled to the cup portion;
   a hoop portion movably coupled to a second end of the backing portion for movement between a securing position in which an end of the hoop portion extends over a second portion of the MU to secure the MU within the cradle and a receiving position in which the hoop portion is moved relative to the backing portion out of engagement with the second portion of the MU, the hoop being biased toward the securing position;
   a latch releasably securing the hoop portion in the receiving position; and
   a plunger extending out of the backing portion in a first direction so that, when engaged by the MU, the plunger is moved in a second direction opposite the first direction moving the latch to release the hoop portion so that the hoop portion moves under its bias into the securing position.

2. The cradle of claim 1, wherein the latch includes a bar and a wheel is rotatably disposed on the bar.

3. The cradle of claim 2, wherein the wheel is releasably received in a recess of the hoop.

4. The cradle of claim 3, wherein, when the plunger is moved in the second direction at least a predetermined distance, the latch moves in the second direction and the wheel rolls out of the recess.

5. The cradle of claim 4, wherein the plunger extends out of the backing portion in the first direction the predetermined distance.

6. The cradle of claim 1, wherein, when in the receiving position, the hoop portion is angled with respect to the backing portion.

7. The cradle of claim 6, wherein, when in the securing position, the hoop portion is substantially perpendicular to the backing portion.

8. The cradle of claim 1, further comprising:
   an electrical connector disposed at least partially in the backing portion configured to couple to a corresponding electrical connector of the MU;
   a printed circuit board disposed in the backing portion configured to couple to the electrical connector; and
   a cable coupled to the backing portion configured to couple to the printed circuit board to establish an electrical connection between the MU and a further electronic device.

9. The cradle of claim 1, further comprising:
   a mounting coupled to the backing portion configured to affix the cradle to a target location.

10. The cradle of claim 3, wherein the hoop portion includes an enlarged surface configured to receive a predetermined force so that the hoop portion is moved to the receiving position, the plunger extends out of the backing portion so that the plunger pushes the MU in the first direction, and the wheel is received in the recess of the hoop portion.

11. A system, comprising:
    a mobile unit (MU); and
    a cradle with a single insertion process comprising:
       a cup portion shaped to receive a first portion of the MU inserted therein;
       a backing portion including a first end coupled to the cup portion;
       a hoop portion movably coupled to a second end of the backing portion for movement between a securing position in which an end of the hoop portion extends over a second portion of the MU to secure the MU within the cradle and a receiving position in which the hoop portion is moved relative to the backing portion out of engagement with the second portion of the MU, the hoop being biased toward the securing position;
       a latch releasably securing the hoop portion in the receiving position; and
       a plunger extending out of the backing portion in a first direction so that, when engaged by the MU, the plunger is moved in a second direction opposite the first direction moving the latch to release the hoop portion so that the hoop portion moves under its bias into the securing position.

12. The system of claim 11, wherein the latch includes a bar and a wheel is rotatably disposed on the bar.

13. The system of claim 12, wherein the wheel is releasably received in a recess of the hoop.

14. The system of claim 13, wherein, when the plunger is moved in the second direction at least a predetermined distance, the latch moves in the second direction and the wheel rolls out of the recess.

15. The system of claim 14, wherein the plunger extends out of the backing portion in the first direction the predetermined distance.

16. The system of claim 11, wherein, when in the receiving position, the hoop portion is angled with respect to the backing portion.

17. The system of claim 16, wherein, when in the securing position, the hoop portion is substantially perpendicular to the backing portion.

18. The system of claim 11, wherein the cradle further comprises:
    an electrical connector disposed at least partially in the backing portion configured to couple to a corresponding electrical connector of the MU;
    a printed circuit board disposed in the backing portion configured to couple to the electrical connector; and
    a cable coupled to the backing portion configured to couple to the printed circuit board to establish an electrical connection between the MU and a further electronic device.

19. The system of claim 11, wherein the cradle further comprises:

a mounting coupled to the backing portion configured to affix the cradle to a target location.

20. A locking arrangement of a cradle having a single insertion process to secure a mobile unit (MU) within the cradle when a first portion of the MU is inserted in a cup portion of the cradle, the locking arrangement comprising:

a latch releasably securing a hoop portion of the cradle in a receiving position in which the MU is capable of being received in the cradle, the latch including a bar in which a wheel is rotatably coupled thereto, the wheel being received in a recess of the hoop portion in the receiving position; the hoop portion being biased toward a securing position in which an end of the hoop portion extends over the MU to secure the MU within the cradle; and a plunger extending out of a backing portion of the cradle in a first direction so that, when engaged by the MU, the plunger is moved in a second direction opposite the first direction moving the latch so that the wheel disengages the recess to release the hoop portion, the hoop portion moving under its bias into the securing position.

* * * * *

UNITED STATES PATENT AND TRADEMARK OFFICE
CERTIFICATE OF CORRECTION

PATENT NO.         : 8,780,553 B2
APPLICATION NO.    : 13/677353
DATED              : July 15, 2014
INVENTOR(S)        : Mark C. Palmer et al.

Page 1 of 1

It is certified that error appears in the above-identified patent and that said Letters Patent is hereby corrected as shown below:

IN THE TITLE PAGE:

In Item (72), under "Inventors," in Column 1, Line 3, delete "Ramat Efal" and insert -- Ramat Ef'al --, therefor.

IN THE SPECIFICATION:

In Column 2, Line 65, delete "to a a" and insert -- to a --, therefor.

In Column 3, Line 50, delete "frrame" and insert -- frame --, therefor.

In Column 5, Line 6, delete "cradle 110" and insert -- cradle 100 --, therefor.

In Column 5, Line 46, delete "plunger 125" and insert -- plunger 135 --, therefor.

In Column 5, Line 61, delete "plunger 125" and insert -- plunger 135 --, therefor.

In Column 5, Line 63, delete "plunger 125 may" and insert -- plunger 135 may --, therefor.

In Column 5, Lines 63-64, delete "plunger 125 no" and insert -- plunger 135 no --, therefor.

In Column 5, Line 65, delete "plunger 125" and insert -- plunger 135 --, therefor.

In Column 5, Line 66, delete "plunger 125" and insert -- plunger 135 --, therefor.

In Column 5, Line 67, delete "plunger 125" and insert -- plunger 135 --, therefor.

In Column 6, Line 1, delete "latch 145" and insert -- latch 140 --, therefor.

In Column 6, Line 47, delete "susbstantially" and insert -- substantially --, therefor.

In Column 7, Line 25, delete "plunger 145" and insert -- plunger 135 --, therefor.

Signed and Sealed this
Fifth Day of July, 2016

Michelle K. Lee
*Director of the United States Patent and Trademark Office*